US012619063B2

(12) United States Patent
Torii

(10) Patent No.: US 12,619,063 B2
(45) Date of Patent: May 5, 2026

(54) LENS, OCULAR OPTICAL SYSTEM, AND IMAGE DISPLAY APPARATUS

(71) Applicant: CANON KABUSHIKI KAISHA, Tokyo (JP)

(72) Inventor: Takashi Torii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 17/935,875

(22) Filed: Sep. 27, 2022

(65) Prior Publication Data

US 2023/0098956 A1 Mar. 30, 2023

(30) Foreign Application Priority Data

Sep. 29, 2021 (JP) ................................. 2021-159556

(51) Int. Cl.
| | |
|---|---|
| *G02B 7/02* | (2021.01) |
| *G02B 5/30* | (2006.01) |
| *G02B 25/00* | (2006.01) |
| *G02B 27/28* | (2006.01) |
| *G06F 1/16* | (2006.01) |

(52) U.S. Cl.
CPC ......... *G02B 25/001* (2013.01); *G02B 5/3083* (2013.01); *G02B 27/283* (2013.01); *G06F 1/163* (2013.01)

(58) Field of Classification Search
CPC .. G02B 5/3083; G02B 25/001; G02B 27/283; G06F 1/163

USPC ......................................................... 359/643
See application file for complete search history.

(56) References Cited

U.S. PATENT DOCUMENTS

2006/0238901 A1 10/2006 Ito

FOREIGN PATENT DOCUMENTS

| | | |
|---|---|---|
| JP | H08309873 A | 11/1996 |
| JP | 2007196665 A | 8/2007 |
| JP | 5361173 B2 | 12/2013 |
| JP | 2020085956 A | 6/2020 |
| JP | 2020095205 A | 6/2020 |

OTHER PUBLICATIONS

Examiner provided machine translation of Noda, JP-2010221516-A (Year: 2010).*

* cited by examiner

*Primary Examiner* — Bumsuk Won
*Assistant Examiner* — Grant A Gagnon
(74) *Attorney, Agent, or Firm* — Canon U.S.A., Inc., IP Division

(57) ABSTRACT

A lens including ejector pin marks formed at contacting portions with ejector pins used in molding, with a first side including the ejector pin marks and a second side not including the ejector pin marks. The ejector pin marks are located outside of an optical effective diameter on the first side, and at least one of the ejector pin marks on the first side is located inside an optical effective diameter on the second side.

16 Claims, 6 Drawing Sheets

*10*

_10_

LENS, OCULAR OPTICAL SYSTEM, AND IMAGE DISPLAY APPARATUS

BACKGROUND

Field of the Disclosure

The present disclosure relates to a lens, an ocular optical system using the lens, and an image display apparatus such as a head-mounted display (HMD) that enables observation of an image on a display element in an enlarged manner through the ocular optical system.

Description of the Related Art

In recent years, a wide angle of view of an ocular optical system has been demanded in a field of the HMD. Further, the HMD is also demanded to be lightweight, to secure a nose relief portion, to deal with various interpupillary distances, and to be downsized at the same time because the HMD is mounted on a head in observing an image. Thus, the wide angle of view is desirably provided not by a simple increase in size of the ocular optical system, but by a reduction of a ratio of a non-optical effective diameter in the ocular optical system.

Japanese Patent No. 5361173 discusses a technique for fabricating a lens having high surface accuracy in an area of an optical effective diameter, and ejector pins used in molding of the lens are installed in a flange portion that is an area of a non-optical effective diameter. Further, in Japanese Patent No. 5361173, the ejector pins are installed outside an optical effective diameter on a second surface of the lens. Typically, the lens molded with the ejector pins installed is high in moldability. In Japanese Patent No. 5361173, however, the lens may be increased in size due to the flange portion in which installation of the ejector pins is taken into consideration.

Japanese Patent Application Laid-Open No. 2020-85956 discusses a configuration of an ocular optical system using polarization. In Japanese Patent Application Laid-Open No. 2020-85956, the above-described non-optical effective diameter and the above-described ejector pins are not discussed; however, if a flange portion in which installation of the ejector pins is taken into consideration is provided outside an optical effective diameter on a second surface of a lens, the ocular optical system may be increased in size due to the flange portion.

SUMMARY

According to an aspect of the present disclosure, a lens is provided including ejector pin marks formed at contacting portions with ejector pins used in molding. The lens comprises a first side including the ejector pin marks, wherein the ejector pin marks are located outside of a first side optical effective diameter, and a second side not including the ejector pin marks, wherein at least one of the ejector pin marks on the first side is located inside a second side optical effective diameter.

Further features of the present disclosure will become apparent from the following description of exemplary embodiments with reference to the attached drawings.

DESCRIPTION OF THE EMBODIMENTS

An exemplary embodiment of the present disclosure is described below with reference to drawings.

Figure 1:
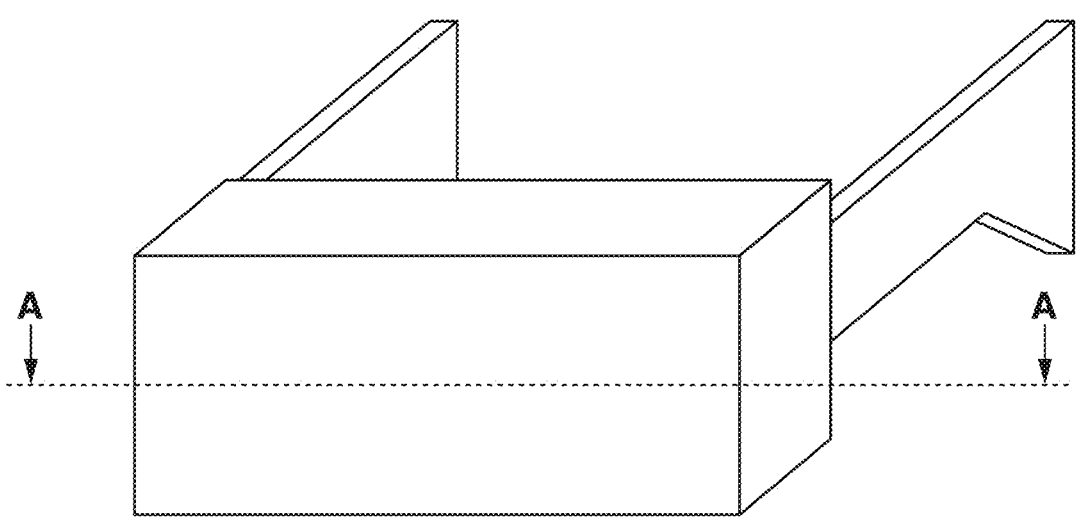
FIG. 1 is a diagram illustrating an example of appearance of an image display apparatus according to an exemplary embodiment of the present disclosure.

FIG. 1 is a diagram illustrating an example of appearance of an image display apparatus 10 according to the exemplary embodiment of the present disclosure. A user (not illustrated) can observe an image by wearing the image display apparatus 10 on the user's head. As the image display apparatus 10, for example, the above-described head-mounted display (HMD) can be adopted.

Figure 2:
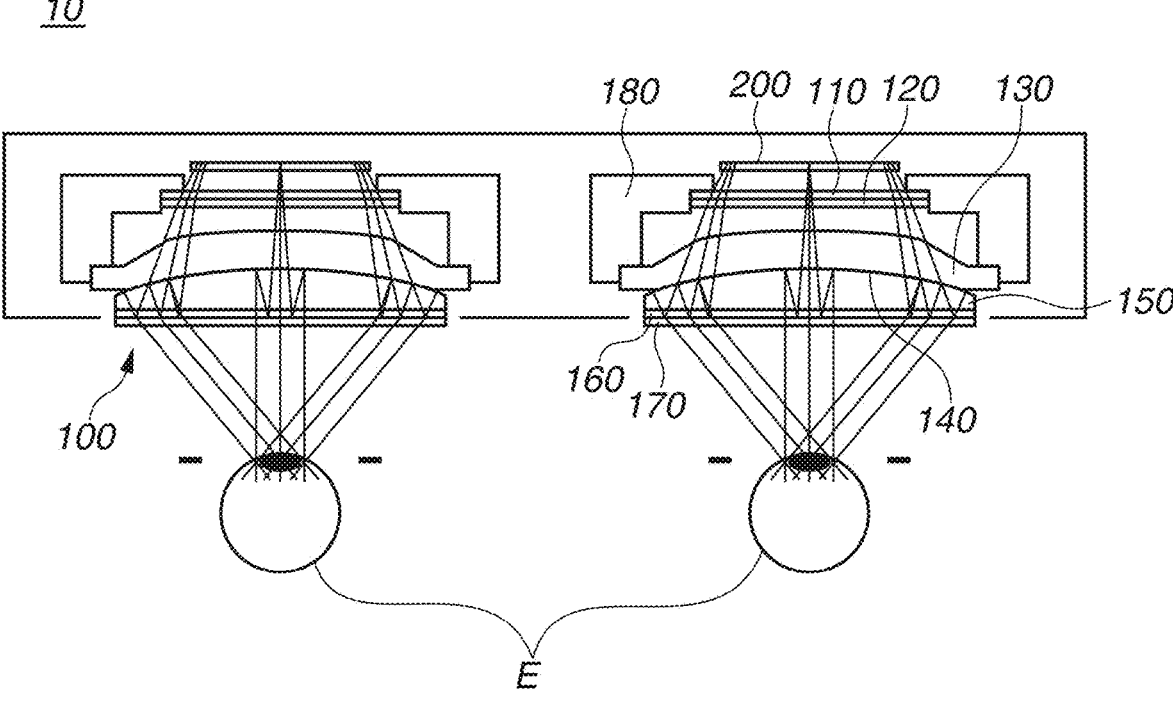
FIG. 2 is a diagram illustrating an example of an internal configuration in cross section taken along line A-A of the image display apparatus illustrated in FIG. 1.

FIG. 2 is a diagram illustrating an example of an internal configuration in a cross-section taken along line A-A of the image display apparatus 10 illustrated in FIG. 1. As illustrated in FIG. 2, the image display apparatus 10 includes an ocular optical system 100 and a display element 200.

The ocular optical system 100 is an optical system that guides light from the display element 200 to an exit pupil. More specifically, the ocular optical system 100 is an optical system that enlarges and projects an original image displayed on the display element 200 as a virtual image and guides the original image to an eye E of the user. The ocular optical system 100 includes a polarizing plate 110, a first phase plate 120, a lens 130, a half mirror 140 constituting a semi-transmission reflective surface, a lens 150, a second phase plate 160, a polarizing beam splitter (PBS) 170 constituting a polarizing beam splitting element, and a lens barrel 180. In the image display apparatus 10, the ocular optical system 100 and the display element 200 are provided to each of right and left eyes E of the user.

The lens 130 and the lens 150 are joined together through the half mirror 140. The lens 130 is molded from a resin. Further, the lens 150 is desirably molded from a resin so that the lens 150 is lightweight; however, the lens 150 may be made of glass. In a case where the lens 150 is made of glass, high quality image observation is possible because birefringence of the lens 150 is extremely small.

The ocular optical system 100 illustrated in FIG. 2 is an optical system in which an optical path is folded by using polarization. The optical path is described below.

First, as illustrated in FIG. 2, the polarizing plate 110 and the first phase plate 120 are disposed between the display element 200 and the lens 130 in order of the polarizing plate 110 and the first phase plate 120 from the display element 200 side. The half mirror 140 is disposed, by vapor deposition, on a surface of the lens 130 (surface on the lens 150 side) opposite to a surface on a side provided with the first phase plate 120. The surface on which the half mirror 140 has been vapor-deposited functions as the semi-transmission reflective surface. Next, the second phase plate 160, and the PBS 170 constituting the polarizing beam splitting element are disposed between the lens 150 and the eye E of the user in order of the second phase plate 160 and the PBS 170 from the display element 200 side. In other words, the second phase plate 160 is disposed on a side of the lens 130 opposite to the side provided with the first phase plate 120, and the PBS 170 constituting the polarizing beam splitting element is disposed on a side of the second phase plate 160 opposite to a side provided with the lens 130.

The second phase plate 160 and the PBS 170 each have a planar shape as illustrated in FIG. 2. The first phase plate 120 and the second phase plate 160 are wavelength plates having a phase difference of λ/4. The second phase plate 160 is in contact with and held by the lens 150. The lens barrel 180 holds the polarizing plate 110, the first phase plate 120, and the lens 130.

At this time, a polarization direction of light passing through the polarizing plate 110 and a slow axis of the first phase plate 120 are inclined by about 45 degrees. Further, a polarization direction of light passing through the PBS 170 and a slow axis of the second phase plate 160 are inclined by about 45 degrees. The polarization direction of the light passing through the polarizing plate 110 and the polarization direction of the light passing through the PBS 170 are substantially orthogonal to each other.

In a case where the ocular optical system 100 is configured as described above, the light emitted from the display element 200 is turned into linearly polarized light by passing through the polarizing plate 110, and the linearly polarized light is turned into circularly polarized light by passing through the first phase plate 120. In the present exemplary embodiment, the polarizing plate 110 is disposed between the display element 200 and the first phase plate 120, and turns unpolarized light emitted from the display element 200 into the linearly polarized light.

Thereafter, the light having passed through the first phase plate 120 is turned into linearly polarized light (first linearly polarized light) by passing through the second phase plate 160 via the lens 130 and the half mirror 140. The polarization direction of the linearly polarized light (first linearly polarized light) is substantially orthogonal to the polarization direction of the light passing through the PBS 170. Thus, the first linearly polarized light is turned into circularly polarized light by being reflected by the PBS 170 and passing through the second phase plate 160. The circularly polarized light having passed through the second phase plate 160 is turned into linearly polarized light (second linearly polarized light) by being reflected by the half mirror 140 and passing through the second phase plate 160. Unlike the above-described first linearly polarized light, the polarization direction of the linearly polarized light (second linearly polarized light) is coincident with the polarization direction of the light passing through the PBS 170. Thus, the second linearly polarized light passes through the PBS 170 and is guided to the eye E of the user. In other words, the PBS 170 constituting the polarizing beam splitting element reflects the incident first linearly polarized light, and allows the second linearly polarized light in the polarization direction substantially orthogonal to the polarization direction of the first linearly polarized light to pass therethrough. Further, the eye E of the user is substantially coincident with the exit pupil of the ocular optical system 100.

As described above, the ocular optical system 100 illustrated in FIG. 2 is configured to be the optical system in which the optical path is folded by using polarization, which makes it possible to reduce the thickness and a focal length of the ocular optical system 100, and to provide image observation with a wide angle of view.

In the present exemplary embodiment, the display element 200 is an organic electroluminescence (EL) display element that radiates unpolarized light. Alternatively, the display element 200 may be a liquid crystal display that radiates linearly polarized light, so that the polarizing plate 110 becomes unnecessary, which makes it possible to reduce the thickness and its cost.

In the ocular optical system 100 illustrated in FIG. 2, the polarizing plate 110 and the first phase plate 120 are bonded to each other with an adhesive layer, thereby constituting one component having a flat plate shape. The polarizing plate 110 and the first phase plate 120 constituting one component may also be bonded to the lens barrel 180 with an adhesive layer; however, a holding means is not limited to the adhesive layer described here.

Subsequently, a configuration to hold the second phase plate 160 that is in contact with and held by the lens 150 is described. The second phase plate 160 and the PBS 170 are bonded to each other with an adhesive layer, thereby constituting one component having a flat plate shape. The second phase plate 160 and the PBS 170 constituting one component may also be bonded to the lens 150 with an adhesive layer; however, a holding means is not limited to the adhesive layer described here.

In the ocular optical system 100 illustrated in FIG. 2, an aberration correction effect is enhanced by using a double-sided aspherical lens as the lens 130 and an aspherical lens having a plano-convex shape as the lens 150. Further, in the present exemplary embodiment, the lens coming into contact with the lens barrel 180 may not be the lens 130 but the lens 150. At this time, a holding means for the lens 130 or the lens 150 by the lens barrel 180 may be ultraviolet (UV) adhesion; however, the holding means is not limited to the UV adhesion described here.

Subsequently, a configuration of the lens 130 schematically illustrated in FIG. 2 is described.

FIG. 3 to FIG. 6 are projection diagrams each illustrating an example of the configuration of the lens 130 schematically illustrated in FIG. 2.

Figure 3:
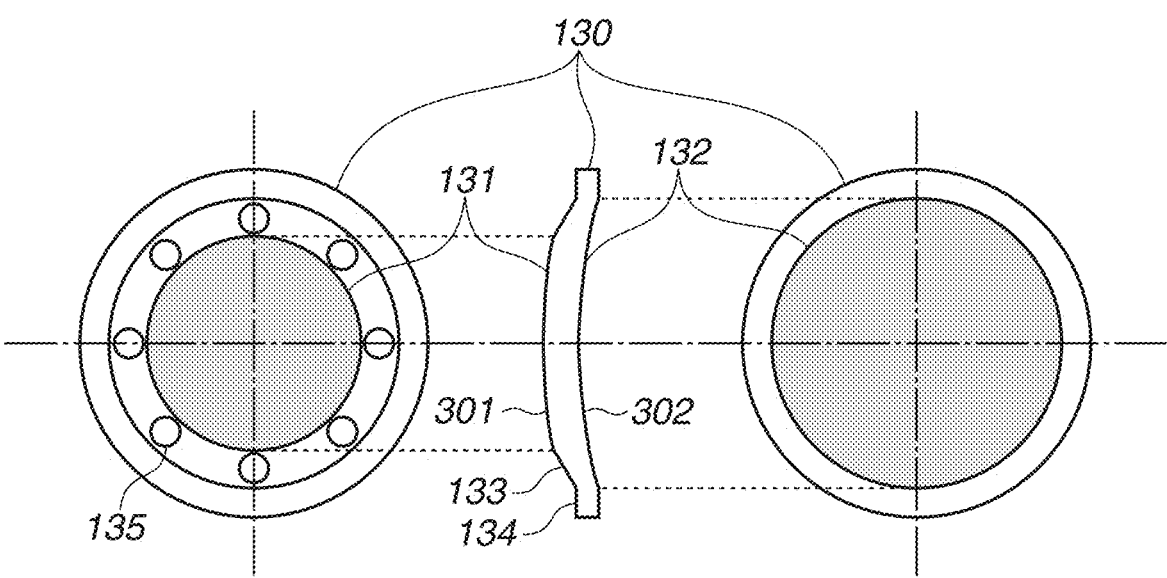
FIG. 3 is a projection diagram schematically illustrating an example of a configuration of a lens illustrated in FIG. 2.

First, a description is provided with reference to FIG. 3.

As illustrated in FIG. 3, the lens 130 has an optical effective diameter 131, an optical effective diameter 132, an inclined surface 133, a flange portion 134, and ejector pin marks 135.

The optical effective diameter 131 is an optical effective diameter on a first side 301 provided with the ejector pin marks 135 of the lens 130. The optical effective diameter 132 is an optical effective diameter on a second side 302 not provided with the ejector pin marks 135 of the lens 130. The optical effective diameter 131 and the optical effective diameter 132 are areas that allow a light flux illustrated in FIG. 2 to pass therethrough or reflect the light flux. As illustrated in FIG. 3, the optical effective diameter 132 is greater than the optical effective diameter 131. The inclined surface 133 is an inclined surface adjacent to the optical effective diameter 131 on the first side 301 provided with the ejector pin marks 135 of the lens 130. The inclined surface 133 contributes to maintenance of a substantially equal thickness of the lens 130. Since the inclined surface 133 is the surface adjacent to the optical effective diameter 131, desirably, the inclined surface 133 is not a rough surface but a polished surface in terms of ghost. The flange portion 134 is an area of a non-optical effective diameter.

The ejector pin marks 135 are contacting portions with ejector pins used in molding of the lens 130. For example, the ejector pin marks 135 are portions pressed by the ejector pins to demold the molded lens 130. In the present exemplary embodiment, as illustrated in FIG. 3, the ejector pin marks 135 are located in an area of the inclined surface 133 outside the optical effective diameter 131 on the first side 301 provided with the ejector pin marks 135 of the lens 130. Further, in the present exemplary embodiment, at least one of the ejector pin marks 135 is located inside the optical effective diameter 132 on the second side 302 not provided with the ejector pin marks 135 of the lens 130.

For example, the first side 301 provided with the ejector pin marks 135 of the lens 130 illustrated in FIG. 3 corresponds to a side (upper side in FIG. 2) provided with the display element 200 of the lens 130 illustrated in FIG. 2. Further, for example, the second side 302 not provided with the ejector pin marks 135 of the lens 130 illustrated in FIG. 3 corresponds to a side (lower side in FIG. 2) provided with the half mirror 140 constituting the semi-transmission reflective surface of the lens 130 illustrated in FIG. 2. In other words, the ejector pin marks 135 provided on the lens 130 in FIG. 3 are arranged between the display element 200 and the half mirror 140 (semi-transmission reflective surface) illustrated in FIG. 2.

Such arrangement of the ejector pin marks 135 illustrated in FIG. 3 makes it possible to prevent an increase in size of the flange portion 134 due to the ejector pin marks 135, and to reduce a ratio of the non-optical effective diameter of the lens 130. As a result, both the downsizing and the wide angle of view of the lens 130 can be provided. In the ocular optical system 100, the lens 130 is the largest member as illustrated in FIG. 2. Thus, it is possible to reduce the ratio of the non-optical effective diameter of the ocular optical system 100.

The ocular optical system 100 may not be an optical system using polarization. Further, an outer diameter of the lens 130 is desirably φ50 mm or less from a viewpoint of usability to deal with various interpupillary distances and to secure a nose relief portion.

As illustrated in FIG. 3, since at least one of the ejector pin marks 135 is located inside the optical effective diameter 132 on the second side 302 not provided with the ejector pin marks 135 of the lens 130, the ejector pin marks 135 are visually recognizable by the user. To make the ejector pin marks 135 inconspicuous and enhance appearance quality, the ejector pin marks 135 may be polished so that the ejector pin marks 135 have surface roughness substantially equal to surface roughness of the inclined surface 133, which is the adjacent surface.

Figure 4:
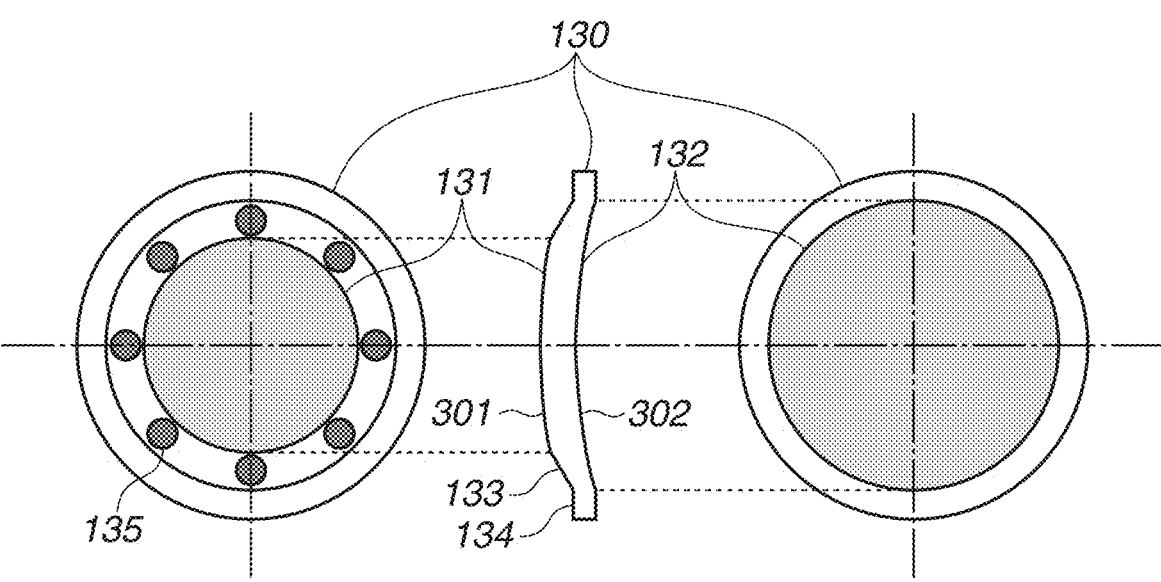
FIG. 4 is a projection diagram schematically illustrating an example of the configuration of the lens illustrated in FIG. 2.
Figure 5:
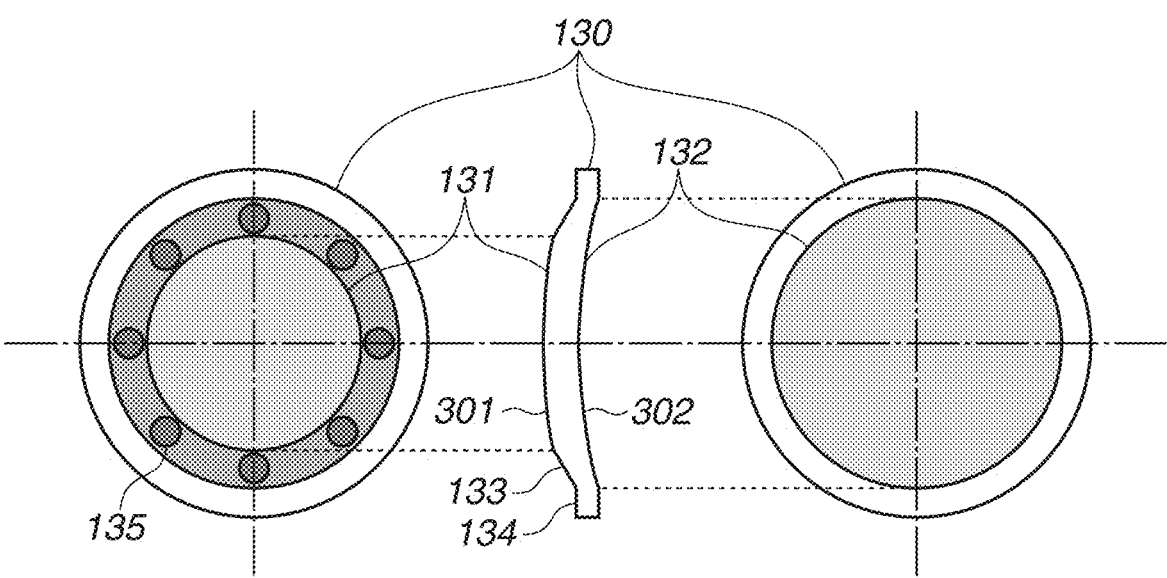
FIG. 5 is a projection diagram schematically illustrating an example of the configuration of the lens illustrated in FIG. 2.
Figure 6:
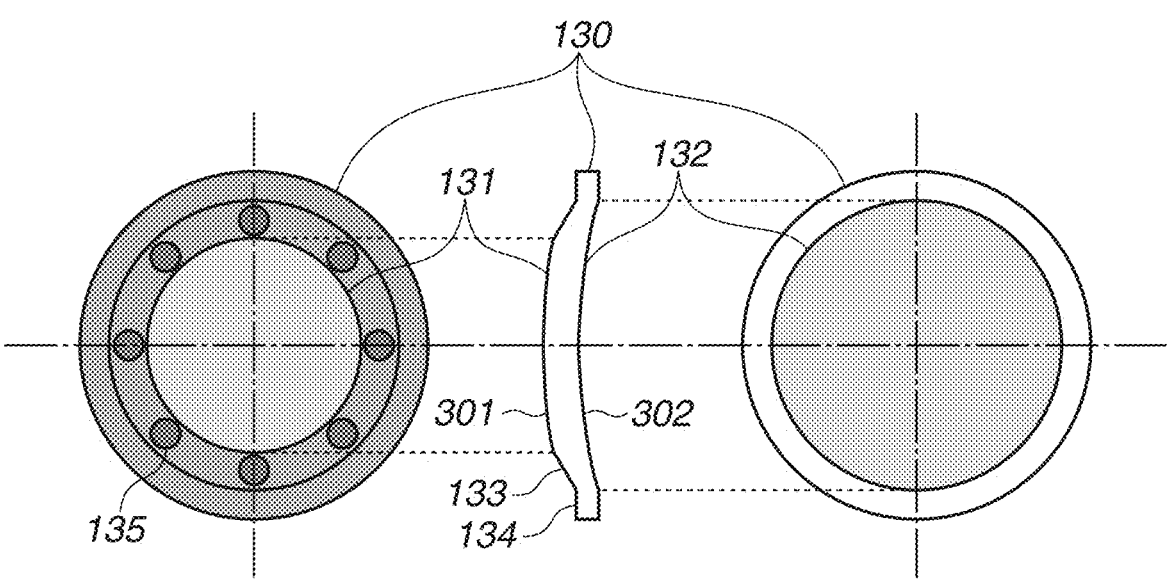
FIG. 6 is a projection diagram schematically illustrating an example of the configuration of the lens illustrated in FIG. 2.

Descriptions are given with reference to FIG. 4 to FIG. 6. In FIG. 4 to FIG. 6, components similar to the components illustrated in FIG. 3 are denoted by the same reference numerals, and detailed descriptions of the components are omitted.

In the present exemplary embodiment, to enhance the appearance quality of the ejector pin marks 135, the ejector pin marks 135 may be painted in black as illustrated in FIG. 4. In the present exemplary embodiment, regions painted in black on the first side 301 are not limited to the ejector pin marks 135. For example, the regions painted in black may include the inclined surface 133 as illustrated in FIG. 5, and further, may be areas other than the optical effective diameter 131 as illustrated in FIG. 6. In FIG. 5 and FIG. 6, black density of areas of the ejector pin marks 135 and black density of other areas are made different to facilitate understanding of positions of the ejector pin marks 135; however, in the present exemplary embodiment, the black density of these areas is desirably the same. In a case where the ocular optical system 100 is a polarization optical system and the ejector pin marks 135 are arranged between the display element 200 and the half mirror 140, the ejector pin marks 135 are to be visually recognized through the PBS 170, the second phase plate 160, and the half mirror 140. Thus, the ejector pin marks 135 are painted in black to be inconspicuous as illustrated in FIG. 4 to FIG. 6, which makes it possible to enhance the appearance quality.

As described above, in the present exemplary embodiment, at least one of the ejector pin marks 135 is located inside the optical effective diameter 132 on the second side 302 not provided with the ejector pin marks 135 of the lens 130.

Such a configuration makes it possible to reduce the non-optical effective diameter of the lens 130 used in the ocular optical system 100. As a result, both the downsizing and the wide angle of view of the lens 130 can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-159556, filed Sep. 29, 2021, which is hereby incorporated by reference herein in its entirety.

What is claimed is:

1. A lens molded from a resin, the lens comprising:
   a first side; and
   a second side opposite to the first side;
   the first side including:
   a first side optical effective diameter;
   an inclined surface;
   a flange portion; and
   ejector pin marks formed at contacting portions with ejector pins used in molding,
   the inclined surface being disposed radially outside the first side optical effective diameter and radially inside the flange portion;
   the second side including a second side optical effective diameter that is larger than the first side optical effective diameter;
   wherein the ejector pin marks are provided on the inclined surface;
   wherein the ejector pin marks are located outside the first side optical effective diameter, and
   wherein at least one of the ejector pin marks is located inside the second side optical effective diameter.

2. The lens according to claim 1, wherein the ejector pin marks have surface roughness substantially equal to surface roughness of the inclined surface.

3. The lens according to claim 1, wherein the ejector pin marks are painted in black.

4. The lens according to claim 1, wherein the lens has an outer diameter of φ50 mm or less.

5. An ocular optical system configured to guide light from a display element to an exit pupil, the ocular optical system comprising:
   the lens according to claim 1;
   a first phase plate disposed between the display element and the lens;
   a semi-transmission reflective surface disposed on a surface of the lens on a side opposite to a side provided with the first phase plate;
   a second phase plate disposed on a side of the lens opposite to the side provided with the first phase plate; and a polarizing beam splitting element disposed on a side of the second phase plate opposite to a side provided with the lens.

6. The ocular optical system according to claim 5, wherein the polarizing beam splitting element reflects incident first linearly polarized light and allows second linearly polarized light in a polarization direction substantially orthogonal to a polarization direction of the first linearly polarized light to pass therethrough.

7. The ocular optical system according to claim 5, wherein the ejector pin marks provided on the lens are arranged between the display element and the semi-transmission reflective surface.

8. An image display apparatus, comprising:
the ocular optical system according to claim 5; and
the display element.

9. The image display apparatus according to claim 8,
wherein the display element radiates unpolarized light, and
wherein the ocular optical system further includes a polarizing plate that is disposed between the display element and the first phase plate.

10. The lens according to claim 1, wherein the inclined surface contributes to maintenance of a substantially equal thickness of the lens.

11. The lens according to claim 1, wherein the inclined surface continuously connects a peripheral edge of the first side optical effective diameter with the flange portion.

12. The lens according to claim 1, wherein the inclined surface is a polished surface.

13. The lens according to claim 3, wherein a region painted in black includes the inclined surface.

14. The lens according to claim 3, wherein regions painted in black include areas other than the first side optical effective diameter.

15. The ocular optical system according to claim 5, wherein the lens is the largest member of the ocular optical system.

16. The ocular optical system according to claim 5, wherein the first side of the lens faces the display element and the second side of the lens faces the semi-transmission reflective surface.

* * * * *